United States Patent [19]

Matej

[11] 3,808,623
[45] May 7, 1974

[54] END WORKING MACHINE TOOL
[75] Inventor: Ronald J. Matej, Parma, Ohio
[73] Assignee: Prutton Corporation, Cleveland, Ohio
[22] Filed: Jan. 3, 1972
[21] Appl. No.: 214,763

[52] U.S. Cl. .......................................... 10/21, 10/9
[51] Int. Cl. ............................................... B23g 9/00
[58] Field of Search .......... 10/4, 9, 21, 31, 59, 101, 10/102, 158

[56] References Cited
UNITED STATES PATENTS

| 1,440,375 | 1/1923 | Craig | 10/21 |
| 3,097,378 | 7/1963 | Meyercordt et al. | 10/21 |
| 3,177,507 | 4/1965 | Becker et al. | 10/21 |
| 3,210,786 | 10/1965 | Moeltzner | 10/21 |

FOREIGN PATENTS OR APPLICATIONS

| 388,069 | 5/1965 | Switzerland | 10/21 |
| 518,394 | 3/1955 | Italy | 10/21 |
| 1,151,712 | 7/1963 | Germany | 10/21 |
| 1,151,712 | 8/1963 | Germany | 10/21 |
| 1,191,207 | 4/1965 | Germany | 10/21 |

Primary Examiner—Charles W. Lanham
Assistant Examiner—E. M. Combs
Attorney, Agent, or Firm—Louis V. Granger

[57] ABSTRACT

A bolt blank chamfering machine tool is disclosed which rotates a blank workpiece held in a space between an arcuate shoe and a pair of rollers on a table. As the table revolves, the workpiece moves in a form of planetary motion and rotates. A slide carrying a tool moves to cut or otherwise shape the end of the workpiece blank by means of a cam follower acting on a stationary cam. This provides chamfering, pointing or otherwise shaping the end of the workpiece. The above description is merely one form of the invention and is not to be construed as limiting on the scope of the invention.

18 Claims, 6 Drawing Figures

END WORKING MACHINE TOOL

BACKGROUND OF THE INVENTION

U.S. Pat. No. 3,217,342 discloses a form of planetary rotation of a workpiece and a rotating cutter nearly, but not quite, coaxial with the axis of planetary rotation works on a workpiece to point or otherwise shape it. The cutter has a surface speed of rotation different from the rate of revolution of the workpiece. Such a structure has the disadvantage of cutting small arcuate gouges from the workpiece because of the small cutter teeth on the rotating cutter. Also, with a rotating cutter there can be no dwell at the termination of the cutting process and, hence, the workpiece as cut is not a perfect cone. Instead, it is partly spiral.

Other methods of chamfering the end of bolt blank workpieces have been used. The bolt blank as made on a heading machine and then with the shank cut off has an end which is not the right shape for threading the bolt blank. The typical bolt heading machine partially shears and partially fractures the wire or rod from which the bolt blank is made. This leaves a ragged end on the bolt blank which would be unsuitable in the finished threaded bolt. If the bolt were first threaded and, second, chamfered, the chamfering operation could deform the thread. Accordingly, the usual practice is to chamfer the bolt blank first and, secondly, to thread it.

One prior art method of chamfering the end of the bolt blank was to force it into a conical counter sunk aperture in a die. This partly extruded the metal to form a conical chamfer on the end of the bolt blank. However, it also extruded the metal to form a slightly enlarged collar larger than the diameter of the bolt blank next adjacent the chamfer. Also, it made a slightly cupped end on the bolt blank. Still further, the bolt blanks tended to stick in the chamfer forming die and they had to be knocked out with a knockout pin moving through an axial hole in the die. This further deformed the end of the bolt blank so that the threading operation subsequently to be performed was imperfect. Accordingly, an object of the invention is to provide a bolt pointing machine which overcomes the above mentioned disadvantages.

Another object of the invention is to provide an end working machine tool which will rapidly point or chamfer cylindrical workpieces.

Another object of the invention is to provide a type of planetary machine wherein lathe type tools are utilized to work on the end of workpieces.

Another object of the invention is to provide an end working machine tool of high productivity.

Another object of the invention is to provide an end working machine tool wherein workpieces are revolved and rotated by the relative revolving of a table and an arcuate shoe.

SUMMARY OF THE INVENTION

The invention may be incorporated in a machine tool for working on a workpiece, comprising, in combination, a shoe having an arcuate surface on a radius from an axis, a table, a pair of rollers journalled on said table parallel to said axis near said arcuate surface, drive means connected to revolve one of said table and said shoe about said axis, feed means to feed a workpiece to the space between said pair of rollers and said arcuate shoe surface to rotate the workpiece as said one of said table and shoe revolves, a coaxial cam fixed relative to said shoe, a tool slide slidably mounted relative to said table adjacent said pair of rollers, a tool mount on said tool slide to mount a tool adjacent the workpiece, and a cam follower on said tool slide cooperating with said cam to move the tool mount to have a tool therein operate on a workpiece rotated in said space.

DESCRIPTION OF THE PREFERRED EMBODIMENT

Figure 1:
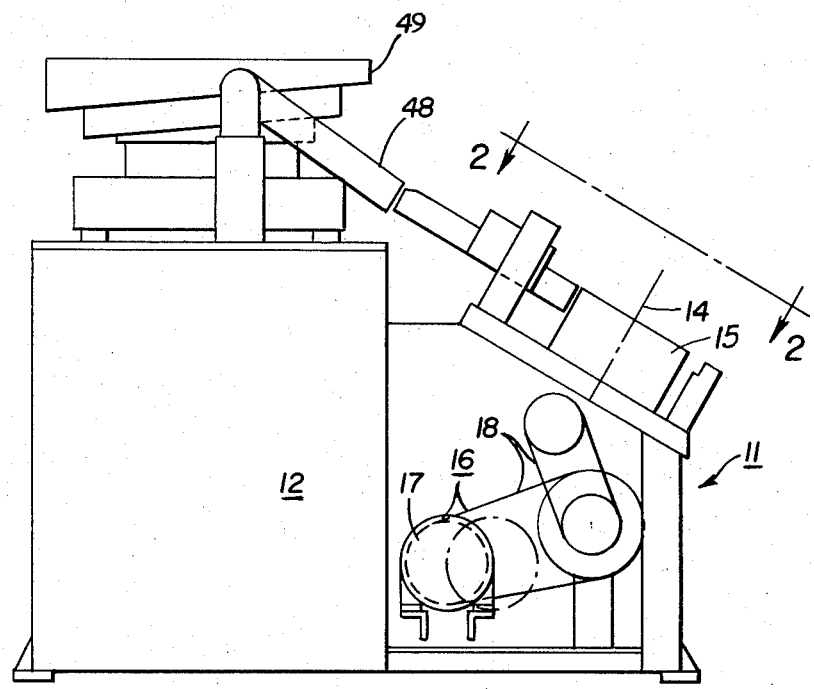
FIG. 1 is a side elevational view of a machine embodying the invention.
Figure 2:
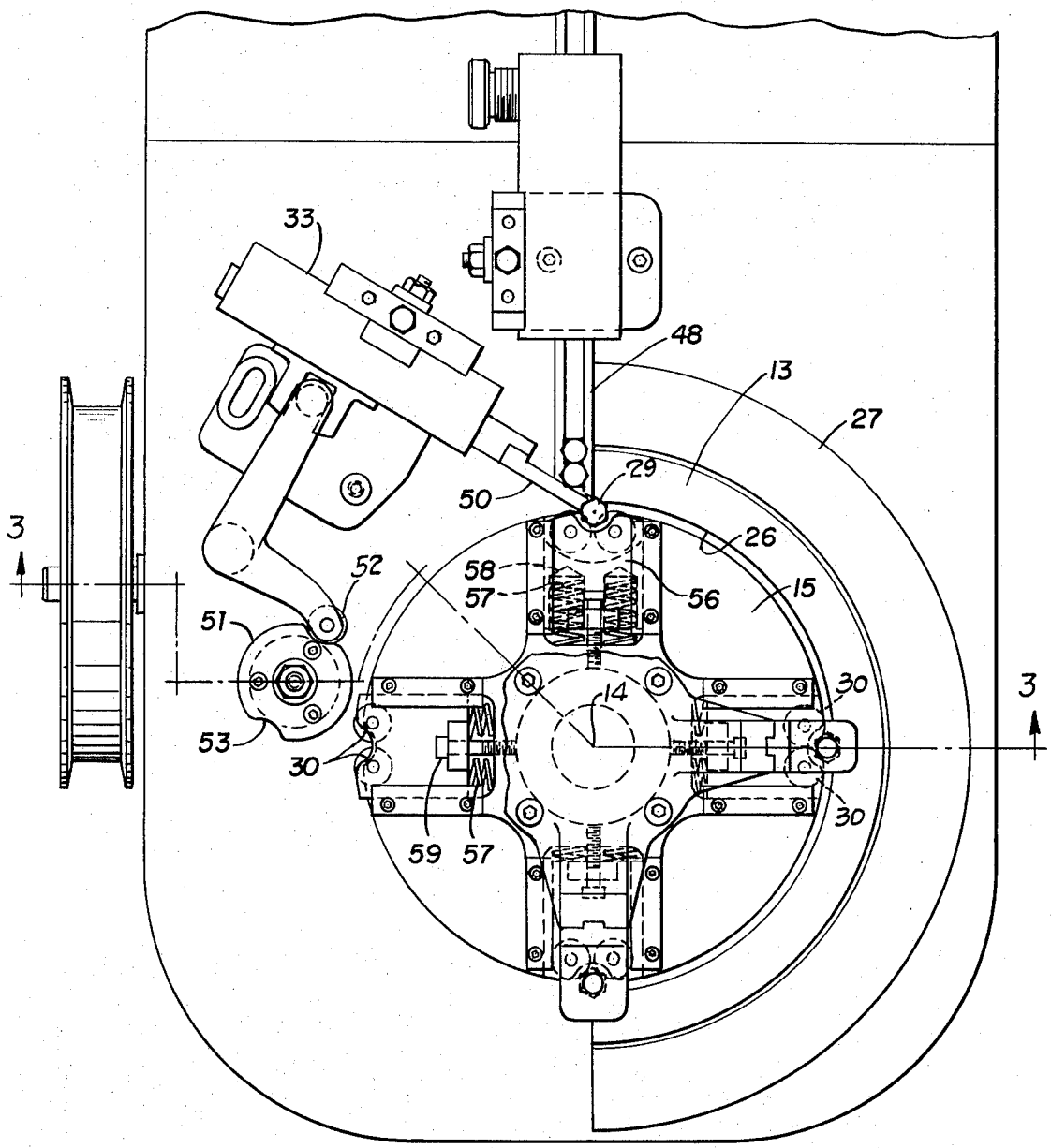
FIG. 2 is an enlarged sectional view on line 2—2 of FIG. 1.
Figure 3:
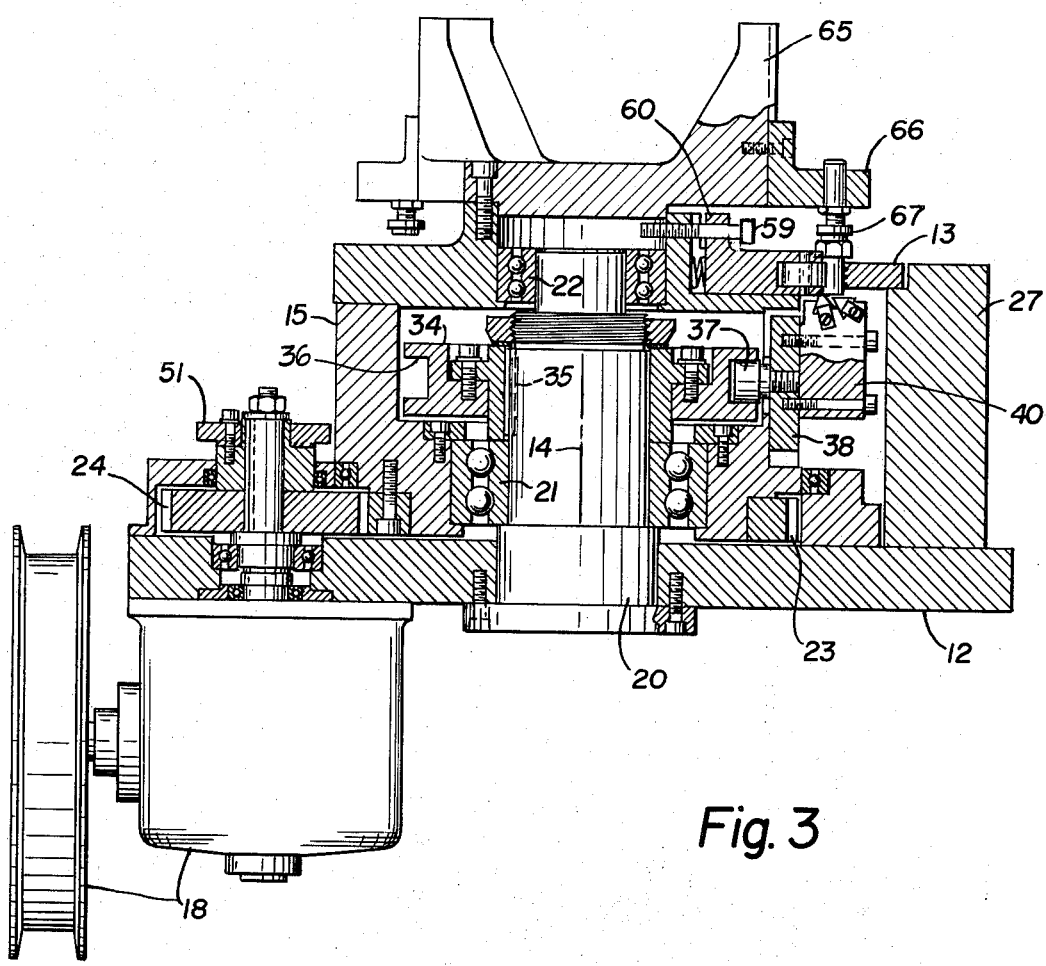
FIG. 3 is a sectional view on line 3—3 of the FIG. 2.

FIGS. 1, 2 and 3 generally illustrate a machine tool 11 which has a frame 12. An arcuate shoe 13 is disposed on a circular arc from an axis 14. A table 15 is also disposed about this same axis 14. Drive means 16 is provided to relatively revolve the shoe 13 and table 15. The drive means 16 includes a motor 17 and a speed reducing drive train 18 to establish this relative revolution. In the preferred embodiment the shoe 13 is stationary on the frame 12 and the table 15 is connected to be revolved by the drive means 16.

FIG. 3 better illustrates this construction with a stationary post 20 fixed on the frame 12. Bearings 21 and 22 are mounted on the post and journal the table 15 for rotation about the axis 14. A gear 23 is fixed on the table 15 and meshes with a pinion 24 driven from the speed reducing drive train 18.

Figure 5:
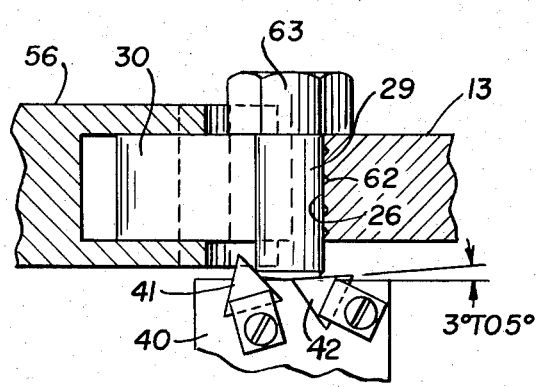
FIG. 5 is an enlarged sectional view of part of FIG. 3.

The shoe 13 in this preferred embodiment has an arcuate surface 26 which is an inwardly facing arcuate surface. The shoe 13 is removably fastened to a shoe support 27 by any suitable means with the shoe support being fixed on the frame 12. The shoe 13 is removable in order to replace it with others having an inner arcuate surface of a different radius to accommodate different size workpiece blanks 29, shown in FIG. 5.

Figure 4:
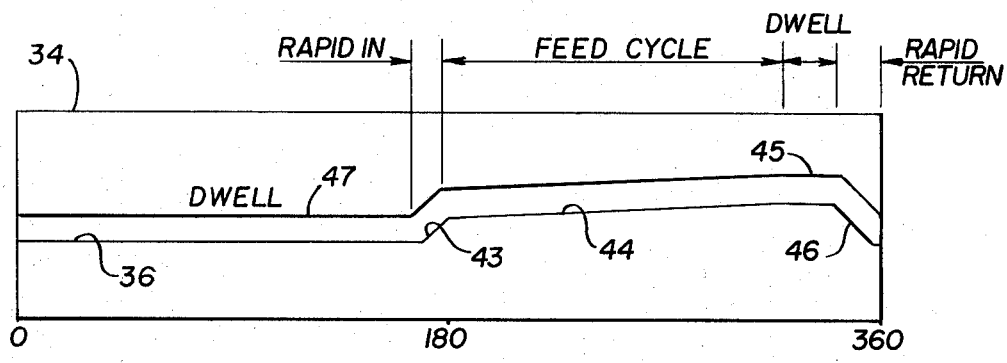
FIG. 4 is a developed view of the cam in the machine.

A pair of rollers 30 are journalled on the table 15 parallel to the axis 14. This pair of rollers is disposed near the arcuate surface 26 of the shoe 13. In the preferred embodiment a plurality of such pairs of rollers are provided on the periphery of the table 15 and this plurality has been shown as four equally spaced pairs of rollers. Feed means 33 is provided to feed workpieces successively to the space between a pair of rollers 30 and the arcuate shoe surface 26 to rotate the workpiece as the table 15 revolves. A first cam 34 is fixed relative to the shoe 13. In this preferred embodiment the shoe 13 is fixed on the frame 12 and the first cam 34 is fixed on the stationary post 20 as by the key 35. The first cam 34 is a drum cam shown in developed view in FIG. 4. This drum cam has a cam track 36 in which a cam roller follower 37 is disposed. The first cam 34 is coaxial about the axis 14. The table 15 carries a plurality of tool slides 38 which are slidable thereon in a direction having a longitudinal component. In this preferred embodiment the tool slides 38 are journalled on the table for sliding movement parallel to the axis 14. There is one tool slide positioned near each pair of rollers. A tool mount 40 is fixed to each tool slide. As better shown in FIG. 5 this tool mount may support a chamfering tool 41 and an end facing tool 42, or either one of them for operation on the end of the workpiece blank 29. Each tool slide 38 has mounted thereon one of the cam followers 37 for cooperation with the stationary cam track 36. FIG. 4 shows a typical cam track 36 and, accordingly, as the table 15 revolves the feed means 33 feeds a workpiece blank 29 into the space between a pair of rollers and the arcuate shoe surface 26. As the workpiece blank rotates during the revolution of the table 15, the cam track 36 has a rapid traverse-in portion 43 to move the tool 41 or 42 close to the end of the workpiece 29. Next, a feed portion 44 of the cam establishes the tool in a progressive feed to have the tool cut the end of the workpiece. A dwell portion 45 of the cam track may be provided to assure a perfect cone on the chamfered end of the workpiece. Finally, a rapid traverse-out portion 46 of the cam track is provided to retract the tool slide 38 and tools and then a long dwell portion 47 is provided during the approximately 180° revolution until another workpiece is fed to that particular pair of rollers.

The feed means 33 may be provided with a bowl feeder 49 into which workpiece blanks 29 are placed. Such bowl feeder is commercially available to feed the workpiece blanks single file down a feed chute 48. At the lower end of this feed chute the blanks 29 are fed to the rollers 30 by a reciprocating plunger 50 actuated by a second cam 51 and cam follower 52. The cam 51 is driven at the speed of the pinion 24 and this may have a 2:1 speed ratio relative to the gear 23. Accordingly, with four pairs of rollers 30, the cam 51 need have only two notches 53 in order to feed a workpiece blank to each pair of rollers as they pass the feed station.

The pairs of rollers 30 in the preferred embodiment are not mounted directly on the table 15, but rather on roller slides 56. There is one roller slide for each pair of rollers and these roller slides are slidably journalled for reciprocation along radii from the axis 14. Compression springs 57 are mounted in pockets 58 in each roller slide and act against the table 15 to provide a large outward force on each roller slide. This firmly clamps each workpiece blank 29 between the respective pair of rollers and the arcuate shoe surface 26. An adjusting bolt 59 is threaded into the table 15 and the head of this bolt may engage an upstanding flange 60 on each roller slide when no bolt workpiece is engaged, as in the 9 o'clock position of FIG. 2. This keeps the roller slide from being pushed out of the table 15 by the springs 57 and also keeps the rollers 30 in proper position to receive workpiece blanks at the feed station.

Figure 6:
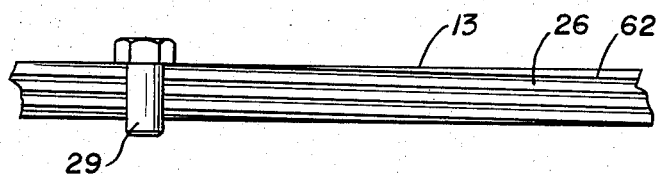
FIG. 6 is a partial view of the arcuate shoe and workpiece blank.

The springs 57 may create a large force, for example, 1,500 pounds of force for a one-half inch diameter of shank of the workpiece blank 29. This large force is desirable to make sure that the workpiece blank 29 rotates as the table revolves. Also, to assure this rotation in a type of planetary motion, the arcuate shoe surface 26 may be roughened. This roughening may take one of several forms, for example, etching or shot blasting, or, as shown in FIG. 6, thread-like grooves 62. These grooves 62 do not actually provide an upstanding thread form on the workpiece, because the rollers 30 have a cylindrical surface. However, these grooves 62 do have influence to hold the workpiece blank 29 longitudinally fixed relative to the shoe 13 by giving a downward urging to the workpiece blank so that the head 63 thereof is pulled down against the upper surface of the shoe 13. Also, FIGS. 2 and 3 show an optional hold down 65. This is a star-shaped element fixed on the rotating table 15. Four radial brackets 66 may be adjustably fixed to the hold down at various longitudinal positions. A stop 67 with a rotating head is mounted in each bracket 66 to act on the head 63 of each workpiece blank 29. Such hold down unit 65 may optionally be employed in the cases of particular forms of workpiece which tend to work upwardly relative to the shoe 13. As illustrated in FIG. 1, the preferred embodiment is to have the axis 14 at about a 30° angle to the vertical and, accordingly, gravity acts to hold the workpiece heads against the top of the shoe 13.

In this preferred embodiment the cam 34 is fixed relative to the shoe 13. Because the shoe 13 is stationary in this preferred embodiment, the cam 34 is also stationary. The tool slides 38 are fixed relative to the table 15 and because in this preferred embodiment the table revolves, the tool slides also revolve. This provides the necessary cooperation between the cam 34 and cam follower 37.

The roller slides 56 are movable in paths toward and away from the shoe arcuate surface 26. In this preferred embodiment these roller slides are movable along radii from the axis 14 so that the path of movement is generally perpendicular to this arcuate surface 26.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine tool for working on a workpiece, comprising, in combination,
    a shoe having an arcuate surface on a radius from an axis,
    a table,
    a pair of rollers journalled on said table parallel to said axis near said arcuate surface,
    drive means connected to revolve one of said table and said shoe about said axis,
    feed means to feed a workpiece to the space between said pair of rollers and said arcuate shoe surface to rotate the workpiece as said one of said table and shoe revolves,
    a coaxial cam fixed relative to said shoe,
    a tool slide mounted for sliding movements on said table adjacent said pair of rollers,
    a tool mount on said tool slide to mount a tool adjacent the workpiece,
    and a cam follower on said tool slide cooperating with said cam to move the tool mount to have a tool therein operate on a workpiece rotated in said space.

2. A machine tool as set forth in claim 1, wherein said slide is mounted for sliding movement substantially parallel to said axis to have a tool work on an end of the workpiece.

3. A machine tool as set forth in claim 1, wherein said drive means revolves said table and said shoe is fixed.

4. A machine tool as set forth in claim 1, wherein said axis is at an angle to the horizontal and to the vertical.

5. A machine tool as set forth in claim 1, wherein said cam is fixed and said cam follower is movable relative to the cam in accordance with said drive means.

6. A machine tool as set forth in claim 1, including a plurality of pairs of rollers substantially symmetrically placed around the periphery of said table for successively defining workpiece holding spaces with said shoe surface,
and wherein said feed means successively feeds workpieces to said spaces.

7. A machine tool as set forth in claim 1, wherein said feed means includes a feed chute to supply workpieces to a feeding station,
and second cam and follower means actuated in timed relation to the revolution of said drive means to feed an individual workpiece to said space.

8. A machine tool as set forth in claim 1, wherein said feed means is fixed relative to said shoe.

9. A machine tool as set forth in claim 1, wherein said drive means revolves said table and said shoe is stationary,
a plurality of pairs of rollers near the outer periphery of said table,
and said shoe surface being an inwardly facing surface to define with the plural pairs of rollers plural workpiece holding spaces.

10. A machine tool as set forth in claim 1, wherein said shoe and table maintain the workpieces in a longitudinally unchanging position,
and said tool slide moves in a direction having a longitudinal component to work on an end of the workpiece.

11. A machine tool as set forth in claim 1, including means in addition to said shoe and table to maintain the workpieces longitudinally fixed.

12. A machine tool as set forth in claim 1, wherein means including said shoe and table maintain the workpieces longitudinally fixed, and said tool slide is movable longitudinally of said axis.

13. A machine tool as set forth in claim 1, wherein said shoe arcuate surface is roughened to aid in rotating the workpiece.

14. A machine tool as set forth in claim 1, wherein said cam has a dwell at the area of maximum in-feed of said tool slide for enhanced shaping of the workpiece.

15. A machine tool as set forth in claim 1, including a roller slide slidable on said table and journalling said pair of rollers.

16. A machine tool as set forth in claim 15, wherein said roller slide is movable in a path toward and away from said shoe arcuate surface,
and means urging said roller slide toward said shoe arcuate surface.

17. A machine tool as set forth in claim 16, whereby said urging means includes spring means.

18. A machine tool as set forth in claim 16, including means limiting movement of said roller slide toward said shoe arcuate surface.

* * * * *